W. F. KERLIN & E. W. BOWEN.
MOLDING MACHINE.
APPLICATION FILED MAY 12, 1908. RENEWED AUG. 25, 1909.
941,930.
Patented Nov. 30, 1909.
6 SHEETS—SHEET 5.
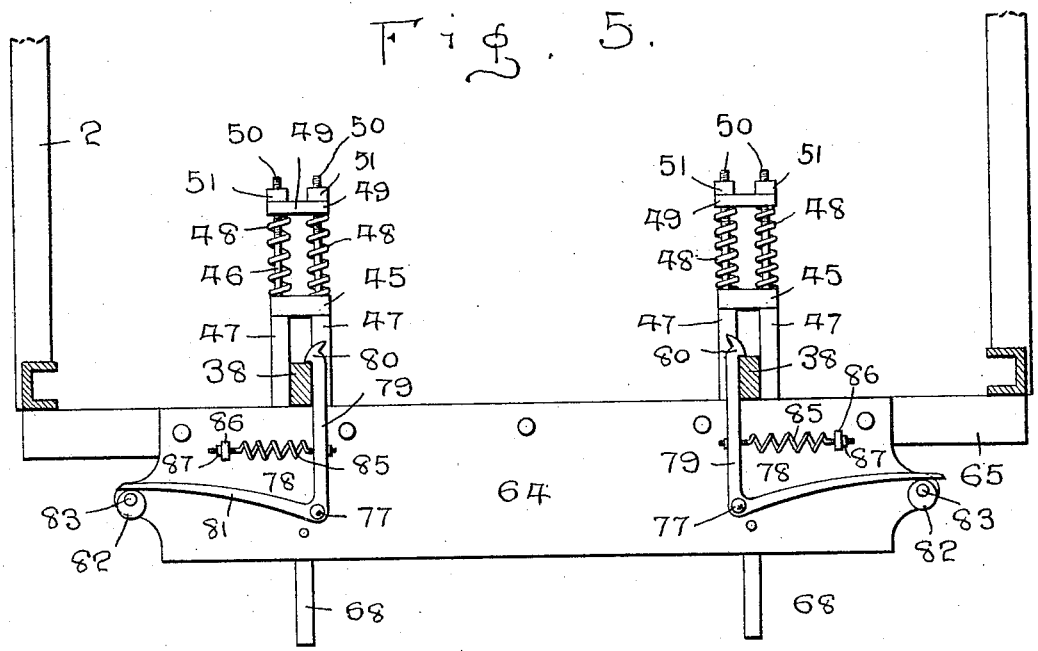
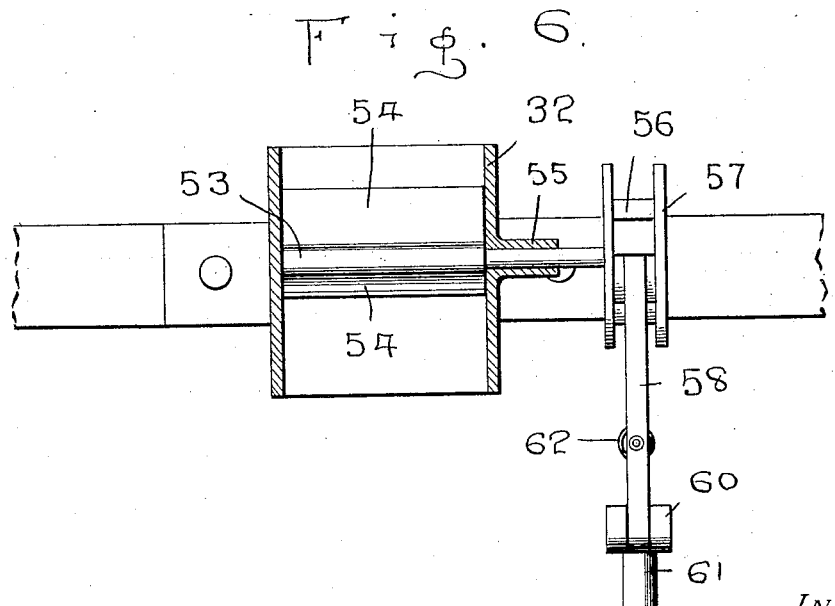

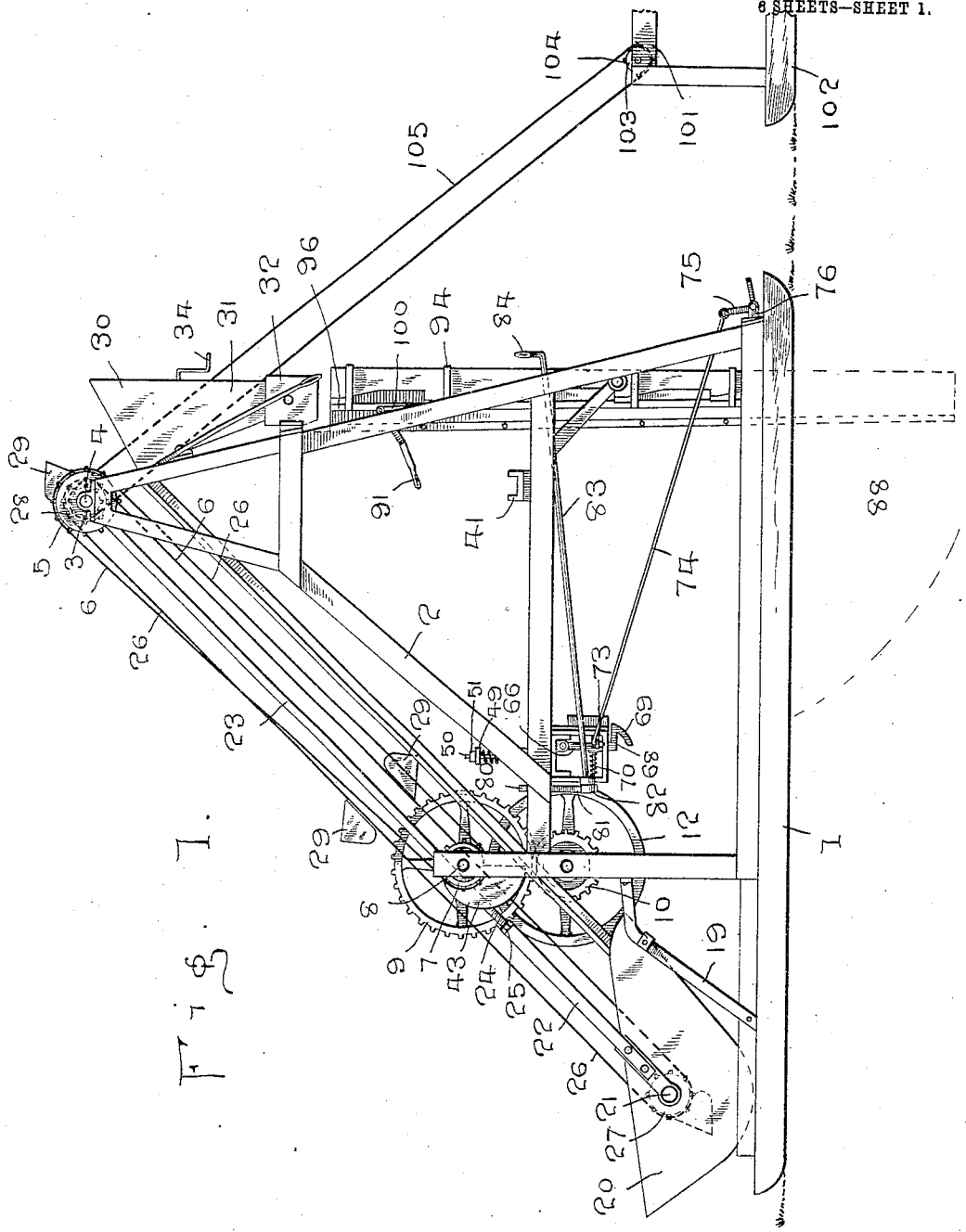

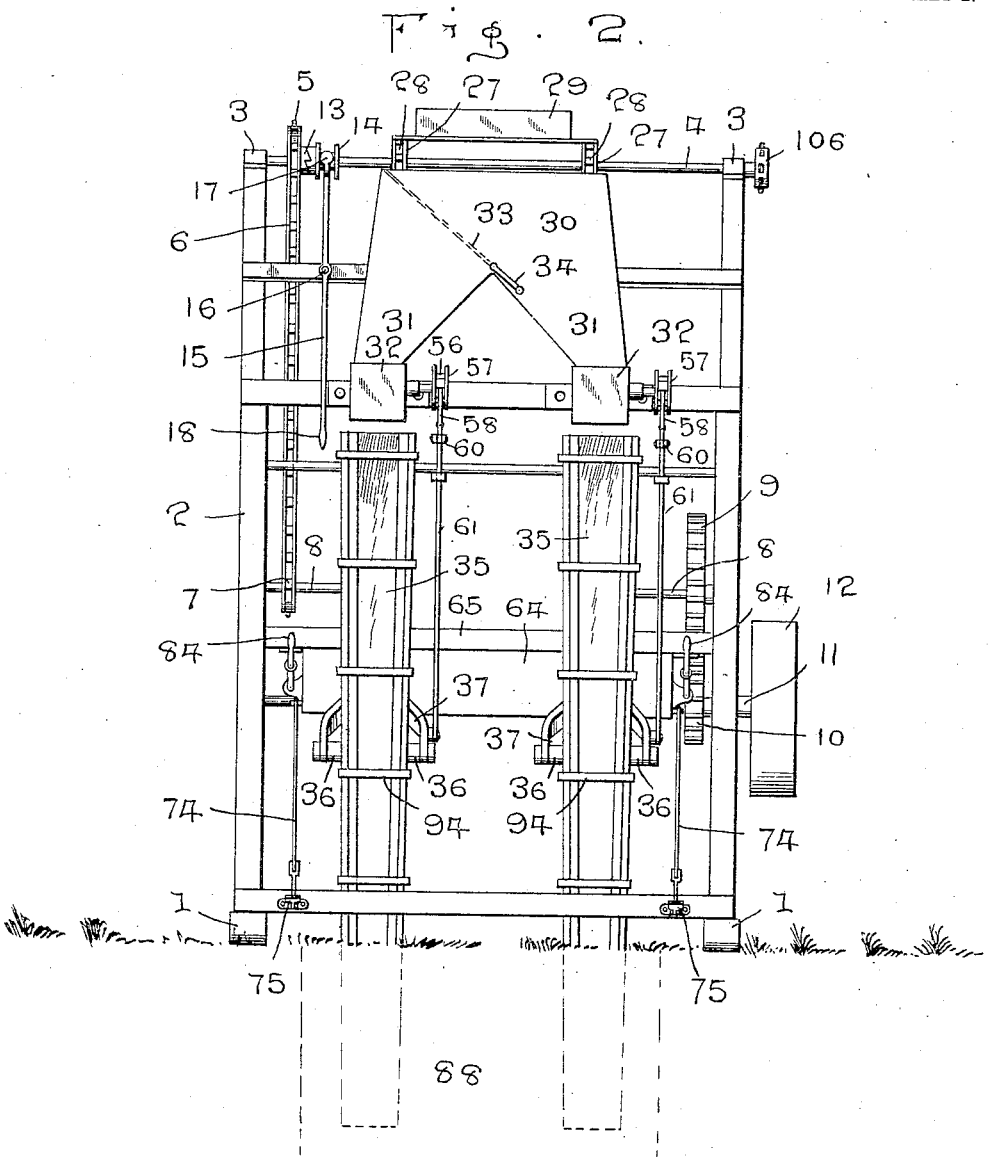

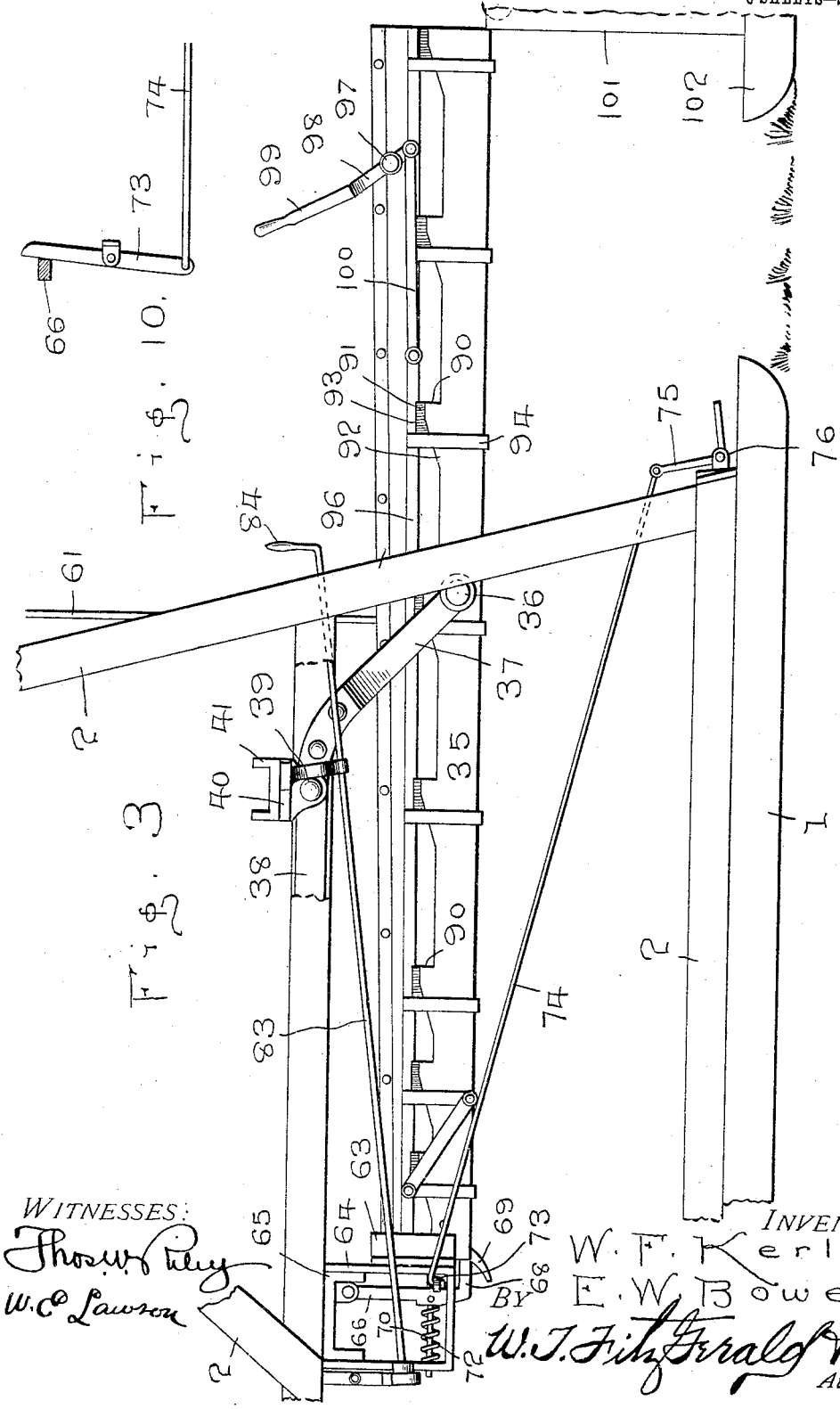

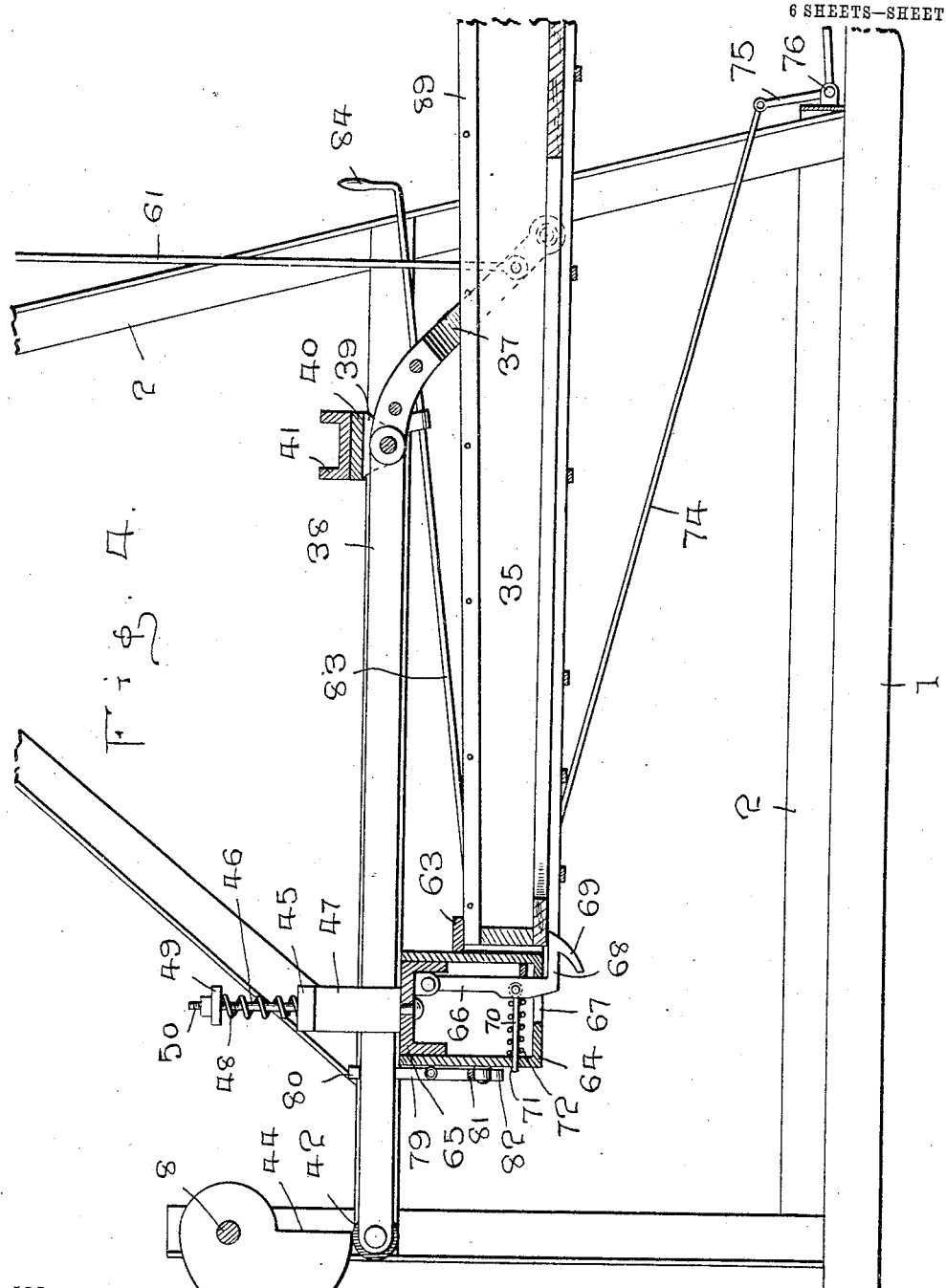

W. F. KERLIN & E. W. BOWEN.
MOLDING MACHINE.
APPLICATION FILED MAY 12, 1908. RENEWED AUG. 25, 1909.
941,930.
Patented Nov. 30, 1909.
6 SHEETS—SHEET 6.
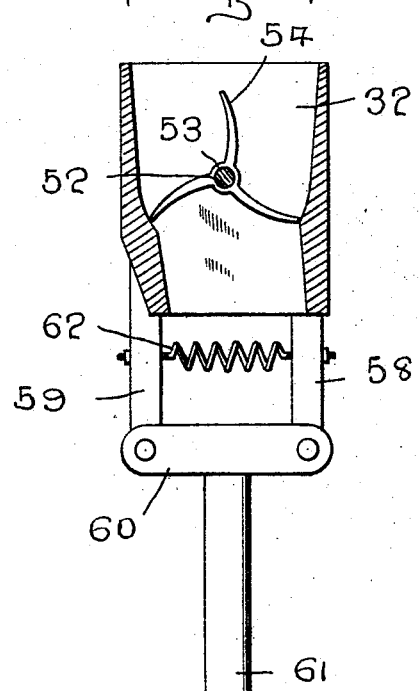
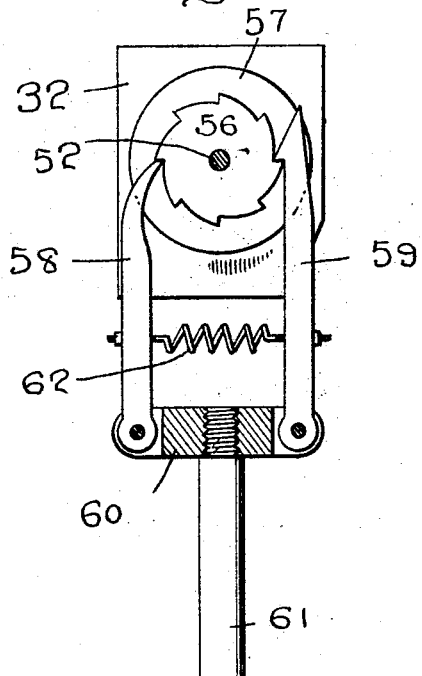
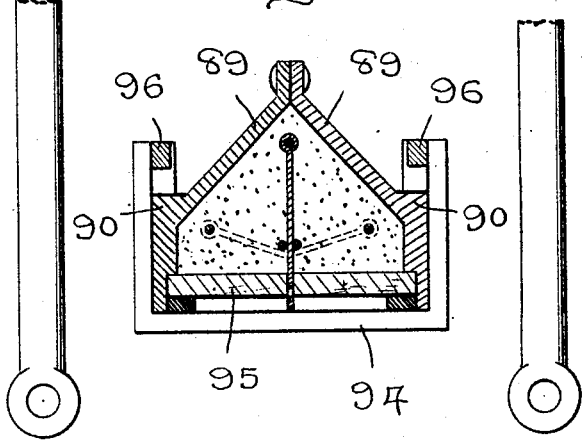
WITNESSES:
Thos. W. Riley
W. E. Lawson
INVENTORS
W. F. Kerlin
E. W. Bowen
BY W. J. FitzGerald & Co.
Attorneys

UNITED STATES PATENT OFFICE.

WILLIAM F. KERLIN, OF ROCKFIELD, AND EDWARD W. BOWEN, OF DELPHI, INDIANA.

MOLDING-MACHINE.

941,930.      Specification of Letters Patent.    Patented Nov. 30, 1909.

Application filed May 12, 1908, Serial No. 432,456. Renewed August 25, 1909. Serial No. 514,605.

*To all whom it may concern:*

Be it known that we, WILLIAM F. KERLIN and EDWARD W. BOWEN, citizens of the United States, residing at Rockfield and Delphi, in the county of Carroll and State of Indiana, have invented certain new and useful Improvements in Molding-Machines; and we do hereby declare the following to be a full, clear, and exact description of the invention, such as will enable others skilled in the art to which it appertains to make and use the same.

This invention relates to new and useful improvements in molding apparatus, and has relation more particularly to an apparatus to be employed in the forming of plastic posts or poles.

It is an object of the invention to provide a novel device of this character wherein a plurality of molds proper are employed, each of said molds being operated one independently of the other.

It is also an object of the invention to provide a novel device of this character wherein the molds when being filled are agitated in order to assure proper compact of the plastic material being delivered within the molds.

It is also an object of the invention to provide a novel device of this character wherein the molds when being filled are in one position and in a second position when the articles formed thereby are to be removed.

It is also an object of the invention to provide a novel device of this character employing chutes for delivering the material within the molds, said chutes being provided with means for preventing clogging or obstruction thereof, said means being operated through the agitation of the molds.

It is also an object of the invention to provide a novel device of this character wherein locking means are provided for holding the molds in inoperative position.

It is also an object of the invention to provide a novel device of this character provided with means whereby a mold when in an inoperative position is effectually held against agitation.

It is also an object of the invention to provide in combination with a device of this character novel means whereby an article formed by the molds may be easily removed from said molds.

It is also an object of the invention to provide a novel device of this character wherein the weight of the molds assists in the agitation of the molds.

It is also an object of the invention to provide a novel device of this character which will be simple in construction, efficient and advantageous in practice and comparatively economical to manufacture.

With the above and other objects in view the invention consists of the details of construction and in the novel arrangement and combination of parts to be hereinafter more particularly referred to.

In describing the invention in detail reference will be had to the accompanying drawings forming part of this specification, wherein like characters of reference denote corresponding parts in the several views, and in which, Figure 1 is a view in side elevation of the molding apparatus, the receiving table being shown in fragment. Fig. 2 is a view in front elevation of the molding apparatus proper, the chain operating mechanism and roller of the receiving table being omitted. Fig. 3 is an enlarged fragmentary view partly in elevation and partly in section of a forward portion of the machine, a mold being shown in its inoperative or horizontal position. Fig. 4 is an enlarged fragmentary view partly in section and partly in elevation of a rear portion of the machine. Fig. 5 is a view partly in elevation and partly in section illustrating the means for holding the molds against agitation when in an inoperative or horizontal position. Fig. 6 is an enlarged sectional view illustrating a detail of the invention, said detail illustrating means for preventing clogging or obstruction of the chutes delivering within the molds. Fig. 7 is a sectional view taken at right angles to the section shown in Fig. 6. Fig. 8 is a view illustrating means for operating the detail shown in Figs. 6 and 7. Fig. 9 is a cross sectional view of one of the molds. Fig. 10 is a fragmentary view illustrating a detail of the invention.

In the drawings 1 denotes supporting runners of any preferred structure, and affixed to these runners 1 is a frame work 2, said frame being so arranged as to provide suitable supports for the various parts of the invention. On the top of the forward end of the frame are fixed bearings 3 in which is mounted a shaft 4. This shaft 4 has loosely mounted thereon a sprocket 5 around which passes a sprocket chain 6. This chain 6 also passes around a sprocket 7 fixed to a shaft 8 mounted in the rear of the frame 2. This shaft 8 also has fixed thereto adjacent the side of the frame opposite to the sprocket 7, a gear wheel 9 which meshes with a smaller gear 10, fixed on a shaft 11 mounted in the frame 2 beneath the shaft 8. This shaft 11 projects beyond one side of the frame 2 and on this projected portion is fixed a driving pulley 12, which is intended to be connected with any suitable source of power, as is believed to be obvious.

The sprocket 5 hereinbefore referred to is provided with a projected clutch hub portion 13, which acts in conjunction with a clutch member 14 suitably fixed to the shaft 4. Thus it will be seen that when the clutch member 14 is in engagement with the portion 13 of the sprocket 5 the shaft 4 will rotate and vice versa. Any means may be employed for sliding the clutch member 14, but in the drawings is illustrated a lever 15 pivoted as at 16, intermediate its length to the frame 2. The upper end of the lever 15 is provided with a fork 17 which embraces the clutch member 14. The opposite end of the lever 15 is provided with a hand grasp 18.

It is thought to be apparent that by proper movement of the lever 15 the clutch member 14 will be either engaged or disengaged from the clutch portion 13 of the sprocket wheel 5.

Projecting from the rear of the frame, adjacent the base thereof is an extension frame 19 which forms a support for a hopper 20 which extends entirely across the frame. Within the side walls of the hopper 20 is mounted a shaft 21 which projects beyond each of the side walls of the hopper, and the projected portions of the shaft 21 are embraced by the free end portions of a yoke 22. This yoke 22 has passing centrally of its base the lower end portion of a rod 23. The upper end of this rod is pivotally held by the shaft 4, hereinbefore referred to. The lower end portion of the shaft 23 is screw threaded as at 24, and this screw threaded portion 24 is engaged by nuts 25, one arranged at either side of the yoke 22. By this means the shaft 21 may be moved with relation to the shaft 4 in order to properly tension the conveyer chains 26. These conveyer chains 26 are preferably two in number, and are passed around sprocket wheels 27, fixed to the shaft 21 within the hopper 20, adjacent the sides thereof and around sprockets 28 fixed to the shaft 4, said sprockets 28 alining with the sprockets 27. These chains 26 have connected thereto the elevating buckets 29, which may be constructed according to the requirements of practice.

The chains 26 are so moved as to cause the buckets 29 to carry material deposited within the hopper 20 upwardly to the top of the framing 2 and discharge said material within a hopper 30 suitably affixed to the frame. This hopper 30 is provided with two discharging chutes 31 and these discharging chutes extend within housings 32 anchored to the frame. In practice it is only desired that the material thrown within the hopper 30 by the buckets be discharged through one of the chutes 31 at a time. In order to effect this arrangement a deflector 33 is pivotally mounted within the hopper 30 at a point intermediate the chutes 31, and adjacent thereto as is more particularly shown in Fig. 2. To operate this deflector 33 it is provided with a projected crank 34. It is thought to be obvious that through the proper manipulation of the crank 34 the deflector 33 will cause the material to be discharged through the desired chute 31.

Beneath each of the housings 32 is suspended a mold 35, this mold normally assuming a vertical position. Intermediate its length at opposed points slightly above its center the mold is provided with trunnions 36 which are pivotally engaged by a fork 37, depending from a rod 38. This rod 38 is pivoted adjacent the fork 37 between ears 39, of a bracket 40 secured to the under surface of a cross-bar 41 of the frame. By having the mold 35 pivotally engaged by the fork 37 at a point above its center it will be seen that the mold will normally assume a vertical position by its own gravity.

The rod 38 projects rearwardly and terminates at a point beneath the shaft 8 and to its free end the rod 38 has journaled an anti-friction roller 42 which is, under normal conditions, contacted with by the cam 43, said roller being held in its contact with the cam 43 by the weight of the mold. The cam 43 is fixed to the shaft 8 and rotates therewith. The cam is so formed as to have a shoulder 44. By this arrangement it will be seen that the cam in its movement will cause the mold to steadily rise toward the housing 32 and when it has reached a point in close proximity thereto the shoulder 44 permits a sudden drop and it is the continuation or succession of these drops that agitates the material within the mold to properly tamp or compact the same.

In order that the movement of the rod 38 caused by the shoulder 44 may not injure the apparatus, more especially the shaft 8 and its cam, a buffer 45 is employed which has loosely passing therethrough the rods 46, projecting upwardly from guide-plates 47 between which the rod 38 passes. These rods 46 are embraced by coil springs 48 which bear against the buffer 45 at their lower ends and at their upper ends against a cross strip 49 loosely riding on the rods. The upper or free ends of the rods are screw threaded as at 50, and these threaded portions are engaged by nuts 51 which contact with the upper surface of the cross strip 49. Through the medium of these nuts 51 the tension of the springs 48 may be regulated as required.

Under ordinary conditions there would be a tendency of the material discharging through the housing 32 to congest, but in order to obviate this possibility the shaft 52 is mounted in the housing and extends thereacross, and within the housing the shaft 52 has affixed thereon the hub 53 from which radiates the curved blades 54 which are of a width approximately the same as the interior width of the housing, as is more particularly shown in Fig. 6.

The shaft 52 projects through the bushing 55 exteriorly of the housing 32. To this projected portion is fixed a ratchet wheel 56, which is provided adjacent its opposed faces with the flanges 57. These flanges 57 are provided to prevent the lateral displacement of the dogs 58 and 59 pivotally secured at one end to a cross head 60. The cross head 60 is in threaded engagement with a pitman 61. This pitman 61 has its lower end in pivotal engagement with the fork 37, hereinbefore referred to. The dogs 58 and 59 have interposed therebetween and secured thereto the contracting spring 62 which holds the dogs 58 and 59 in engagement with the ratchet 56. The dog 58 is so formed as to engage the ratchet when the pitman 61 is moved upwardly, while the dog 59 is so formed as to engage the ratchet when the pitman 61 moves downwardly. By having the pitman 61 pivotally connected to the fork 37 it will be seen that the blades 54 will be rotated when the mold 35 is being agitated.

In the actual operation of the device one mold is being filled while the article formed by a second mold is being removed. When it is desired to remove the article, in this instance a fence post, from the mold it is rotated on its trunnions 36 in such direction as to cause its lower end to swing upwardly and abut against a projection or stop 63, carried by the depending housing 64 suitably fixed to the frame 1.

To a cross-beam 65 of the framing and within the housing 64 is pivoted a latch 66 which projects through an opening 67 in the lower face of the housing. This latch 66 has a hook portion 68 provided with a depending, inwardly curved lug 69. When the mold 38 is elevated it will contact with the curved lug 69 and ride thereover, and when the mold 35 has contacted with the stop 63 the latch, or more properly speaking the hook 68 will swing under the mold 35 and hold it in its inoperative or horizontal position.

In order to assure the hook 68 passing under the mold 35, a rod 70 is pivoted at one end of the latch 66, while the opposite end portion thereof passes through an opening 71 in the rear face of the housing 64. Embracing the rod 70 and interposed between the housing 64 and the latch 66 is a coil spring 72. As is believed to be apparent this coil spring 72 will cause the hook 68 to pass beneath the mold 35 when the mold contacts with the stop.

In order to disengage the hook 68 from the mold 35 a short lever 73 is pivoted at one end to the housing 64, and has its opposite end engaged with a rod 74. The lower end of this rod 74 is in pivotal engagement with the upstanding member of a bell lever 75. This bell lever 75 is pivotally held by a bracket 76 secured to the forward end of the framing 2. The short lever 73 is pivoted intermediate its length and the inner end portion thereof contacts with the latch 66 and forces the same inwardly, as is believed to be apparent.

When the mold 35 is in its inoperative or horizontal position it is necessary that it be held against agitation. To obtain this result the inner face of the housing 64 has pivoted, as at 77, the bell lever 78. The upright stem 79 of the lever terminates in a hook 80 which is intended to pass over the upper edge of the rod 38 and hold the same against the cross beam 65, and thus against oscillation on its pivot.

The horizontal portion 81 of the bell lever has its under surface contacted with by an eccentric 82 fixed to the shaft 83 which projects to the forward end of the machine and terminates in the crank 84, by means of which the eccentric is rotated.

When the eccentric 82 is rotated it contacts with the stem 81 and thereby forces the stem 79 and its hook 80 away from the rod 38, and said rod is free to oscillate. When, however, the eccentric is moved away from the stem 81, the stem 79 is pulled toward the rod 38 by the contracting spring 85 secured at one end to the stem 79 and at its opposite end to a lug 86 formed on the housing 64. Through the medium of the nut 87 the tension of the spring may be adjusted as desired.

The molds 35, in the present instance are illustrated as constructed to form inclined posts and attention is directed to the fact that the smaller ends of the posts are at the bottom. It is also to be observed that when the machine is in operation that portion of the supporting area, in the present instance the ground, is recessed as at 88. This is done to permit freedom of movement of the post without the necessity of making the framing 2 of an extreme or unnecessary height.

While the molds 35 may be of any desired structure it is preferred that the form of mold be employed as is illustrated in the drawings. This mold is employed in the formation of a post described and claimed in a companion application. The mold 35 comprises two side sections 89 of proper configuration provided along their longitudinal edges with the shoulders 90. Each of these shoulders 90 has a straight upper portion 91, and an inclined portion 92. Under normal conditions the straight portions 91 are engaged by arms 93, projecting from straps 94 which pass beneath the molds 35 on which rests the face-board 95, said face-board in the present instance being termed a base. These straps are secured at their upper edges by the connecting bars 96. To the sections 89 of the molds is pivoted intermediate the length of its forks as at 97 the yoke 98, which is provided with an operating handle 99. Each of the free ends of the fork is pivotally secured to a link 100, which is in turn pivotally secured to a connecting rod 96.

When the mold is in an inoperative or horizontal position, as is more particularly shown in Figs. 3 and 4, it is only necessary to give an outward movement to the operating handle 99 to force the arms 93 inwardly, and when said arms pass above the inclined portions 92 it will cause the base-board 95 to lower and this lowering of the base-board permits the ready removal of the article formed within the mold.

While any means may be employed for withdrawing the post from the mold it is desired that the mechanism indicated in the drawings be used. In this instance a suitable table 101 is supported on runners 102 and in the top of the table is mounted a series of transversely arranged rollers 103. The table 101 is of such height as to be approximately flush with the lower surface of a mold 35 when in an inoperative or horizontal position, and is so positioned as to be in close proximity to the outer end thereof.

When the base-board 95 is lowered an operator will manually give the post formed within the mold an initial movement until the post rests on the end roller 103 of the table 101. This end roller 103 is provided with a sprocket 104 around which passes a chain 105. This chain 105 also engages a sprocket 106 fixed to a projected portion of the shaft 4. It will thus be seen that the end roller 103 is continuously rotated during the operation of the machine, and this rotation of the roller when contacting with the post will withdraw the post from its mold.

While it is believed that from the foregoing description the operation of the invention is apparent it is believed well to state that the material to be discharged within the molds is suitably prepared before it is placed within the hopper 20.

What we claim is:

1. In a molding apparatus, the combination of a frame, rods pivoted thereto, molds carried by the rods, means for oscillating the molds, bell levers carried by the frame, one end of the bell levers being provided with hooks to engage the rods to hold the same against oscillation, eccentrics arranged adjacent the opposite ends of the bell levers to contact therewith to force the hooks from the rods, and means for rotating the eccentrics.

2. In a molding apparatus, the combination of a frame, rods pivoted thereto, molds carried by the rods, means for oscillating the molds, bell levers carried by the frame, one end of the bell levers being provided with hooks to engage the rods to hold the same against oscillation, eccentrics arranged adjacent the opposite ends of the bell levers to contact therewith to force the hooks from the rods, means for rotating the eccentrics, and a contraction spring secured at one end to each of the bell levers adjacent the hook, the opposite end of the spring being secured to the frame, said spring being arranged to normally hold the hook in engagement with a rod.

3. In a molding apparatus, the combination of a frame, rods pivoted thereto, molds carried by the rods, guide-plates between which said rods extend, rods projecting upwardly from the guide-plates, a buffer loosely engaging the last mentioned rods and springs carried by the last mentioned rods above the buffer contacting with the buffer.

4. In a molding apparatus, the combination of a frame, rods pivoted thereto intermediate their lengths, molds carried by one end of the rods, latches engaging the molds to hold said molds in certain positions, bell levers carried by the frame and rods connecting the bell levers and the latches whereby the latches may be caused to become disengaged from the molds.

In testimony whereof we have signed our names to this specification in the presence of two subscribing witnesses.

WILLIAM F. KERLIN.
EDWARD W. BOWEN.

Witnesses:
JOHN H. CARTWRIGHT,
BESSIE M. WILSON.